United States Patent [19]
Wada et al.

[11] Patent Number: 5,379,116
[45] Date of Patent: Jan. 3, 1995

[54] CELL-PACKING SYSTEM OF CODED VIDEO SIGNAL USING FIXED BIT LENGTH CELLS

[75] Inventors: Masahiro Wada; Yasuhiro Takishima, both of Saitama, Japan

[73] Assignee: Kokusai Denshin Denwa Co., Ltd., Tokyo, Japan

[21] Appl. No.: 72,489

[22] Filed: Jun. 7, 1993

[30] Foreign Application Priority Data
Jun. 9, 1992 [JP] Japan ............................ 4-173706

[51] Int. Cl.[6] ........................................... H04N 1/419
[52] U.S. Cl. ................................... 358/431; 358/261.1; 341/67
[58] Field of Search ............... 358/261.1, 431, 133, 358/426, 141; 370/94.1, 94.2, 82, 102, 110.1, 60.1, 60; 341/67

[56] References Cited
U.S. PATENT DOCUMENTS 4,376,933 3/1983 Saran et al. ..................... 341/67
4,963,867 10/1990 Bertrand ......................... 341/67

OTHER PUBLICATIONS

"Structured Packing of Coded Video Signals for ATM Networks", Wada et al, VISICOM '91, 4th International Workshop on Packet Video, Aug. 29-30, 1991, pp. A2-1-A2-6.

Primary Examiner—James J. Groody
Assistant Examiner—Cheryl Cohen
Attorney, Agent, or Firm—Nikaido, Marmelstein, Murray & Oram

[57] ABSTRACT

A coded video signal encoded into a variable length code is packed into a frame called a cell having a predetermined number of fixed bits for transmission through ATM (Asynchronous Transfer Mode) which is subject to cell loss due to the congestion of network nodes or bit errors in cell headers, causing burst errors or synchronization slips in a received video signal. In order to avoid such errors, one idea for a variable length transmission unit is introduced. A transmission unit has a plurality of cells and any coded video signal terminates in the transmission unit; in other words, a coded video signal is not shared by two transmission units. A transmission unit is closed or terminated during packing operation when the number of available bits in a cell under packing operation becomes less than a predetermined first threshold value and when a cell number in the transmission unit reaches a predetermined second threshold value, so that transmission efficiency is improved. The remainder of bit positions not occupied by a coded video signal in the last cell in a transmission unit are filled with idle fill bits. The first threshold value depends upon a cell number in a transmission unit so that the smaller the cell number is, the smaller the first threshold value.

5 Claims, 4 Drawing Sheets

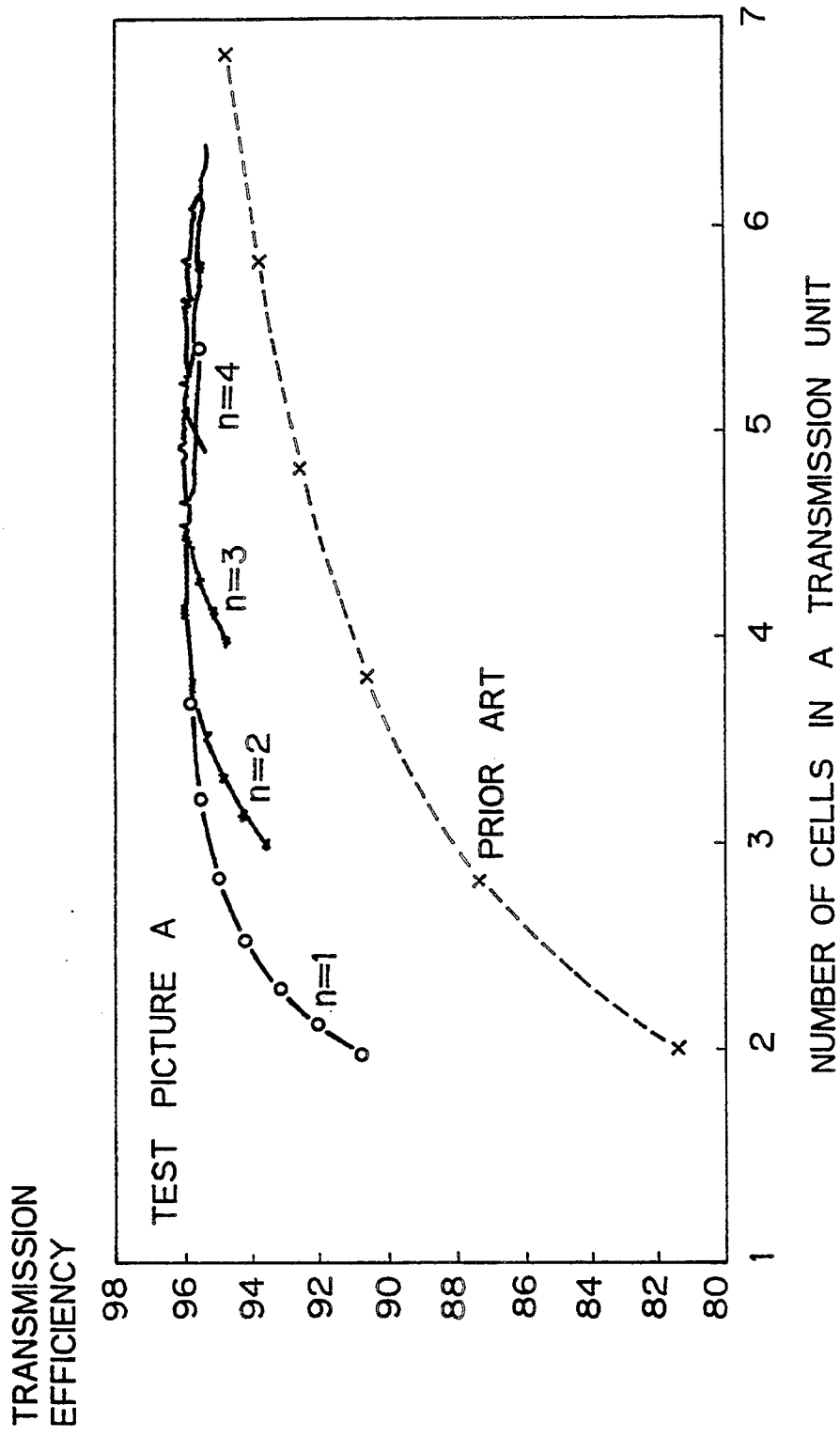

CELL-PACKING SYSTEM OF CODED VIDEO SIGNAL USING FIXED BIT LENGTH CELLS

FIELD OF THE INVENTION

The present invention relates a packing system for a variable length coded video signal into a cell which has a predetermined fixed length. The present invention is used for digital transmission, including television transmission systems, teleconference systems, and/or videophone system, which encodes video signal with variable length digital codes. The present invention is preferably used in a broad-band ISDN (Integrated Services Digital Network) system which is based upon ATM (Asynchronous Transmission Mode), which transmits digital information by dividing information into a cell which has fixed length which is for instance 48 bytes long.

BACKGROUND OF THE INVENTION

In communication network and transmission line using an ATM (Asynchronous Transmission Mode) like broad-band ISDN, video information in variable length digital form is packed into a frame which is called a cell, and has a predetermined fixed bit length. The video information is transmitted, multiplexed/de-multiplexed, and/or exchanged for each cell, so that high speed large capacity communication is obtained with the required flexibility.

In an ATM network which is based upon a statistical multiplex principle, cell loss might occur with some statistics due to possible congestion of network nodes and/or bit errors in cell headers. This causes burst errors or synchronization slips in end-to-end data bitstreams and damages decoded picture quality. Since that error cannot be compensated by conventional forward error correction systems such as BCH or Reed-Solomon coding, some specific consideration is requested so that excellent picture quality is kept in spite of cell loss, when a video signal is encoded with less redundancy through information compression.

A structured packing system has been proposed for that purpose. That structured packing system encodes video signals for each picture block, taking into account the structure of coded video signals, so that a boundary of cells coincides with the data boundary of coded video signals or picture blocks in every predetermined period. The structured packing system has the advantage that the deterioration of picture quality due to cell loss is limited.

However, the prior structured packing system has the disadvantage that some undesirable fill bits which are idle must be inserted in a cell, in order to coincide a boundary of cells with the data boundary of coded video signals in every predetermined period. When we try to shorten the period to coincide the boundaries to get rid of the deterioration in the picture quality, the transmission efficiency is decreased because of an increase in idle fill bits. Therefore, the prior structured packing system has the trade off between picture quality and transmission efficiency.

SUMMARY OF THE INVENTION

It is an object, therefore, of the present invention to provide an improved cell-packing system by overcoming the disadvantages and limitations of prior cell-packing systems.

It is also an object of the present invention to provide a cell packing system which provides high transmission efficiency, with excellent picture quality in spite of cell loss.

It is also an object of the present invention to provide a cell packing system which has fewer idle fill bits.

The above other objects are attained by a packing system of video signals encoded with a variable length code into a cell having a fixed bit length for transmission comprising means for determining a transmission unit which has at least one cell, in which data boundary of coded video signal coincide with a boundary of a transmission unit; means for effecting the packing operation the when number of available bits in a cell under packing is equal to or larger than a predetermined first threshold value, and terminating the packing operation to close a transmission unit when the number is less than the value; and means for filling idle fill bits in available bit positions in a last cell in the transmission unit.

BRIEF DESCRIPTION OF THE DRAWINGS

The foregoing and other objects, features, and attendant advantages of the present invention will be appreciated as the same become better understood by means of the following description and accompanying drawings wherein;

FIG.4 shows curves showing the effect of the present invention.

DESCRIPTION OF PREFERRED EMBODIMENTS

Figure 1:
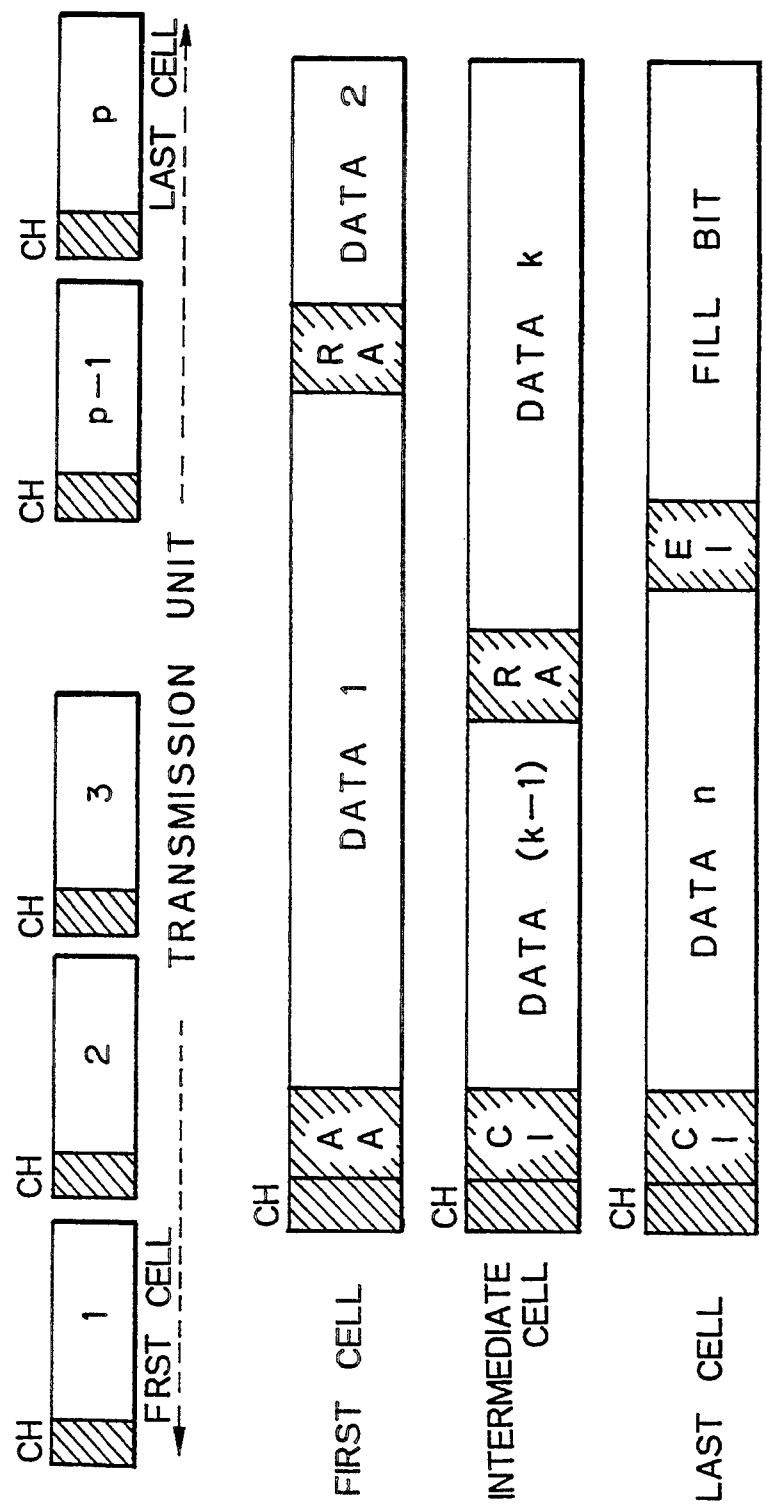
FIG.1 shows a structure of a transmission unit which has a plurality of cells according to the present invention.

FIG.1 shows a structure of a transmission unit which has a plurality of cells according to the present invention. In the figure, a boundary of cells coincides with a boundary of the data boundary of coded video signals in every p cells, where p is a positive integer. In other words, a coded video signal is not shared by two transmission units, although it may be shared by two cells in a transmission unit. The p number of cells constitute a transmission unit. The value p is an integer, and is variable depending upon the relations of coded video signal which has variable length and a cell which has fixed length.

Each cell has a cell header CH, and a predetermined number of bit positions, for instance, 48 bytes.

A first cell in a transmission unit accepts a first coded video signal #1. If some bit positions are available or empty after the first coded video signal is packed in a first cell, it accepts a second video signal #2. If all the bits of the second video signal are not accepted in the first cell, the rest of the second video signal is inserted into the second cell.

Similarly, video signals #(k−1), #k et at are inserted into intermediate cells.

The last video signal #n is inserted in the last cell which is also filled with idle fill bits for the rest of the bit positions which have no video signal.

In the figure, the symbols AA, and RA are address fields of a coded video signal, and CI and EI are identifiers of data structures. The symbol AA shows an absolute address, RA shows a a relative address, CI shows continuation of a cell, and EI shows the end of a coded video signal.

When some conditions are satisfied, the cell packing of video signals is stopped, and idle fill bits are inserted in the remaining bit positions of the last cell. This is called to closing or terminating a transmission unit.

Then, the cell packing operation is initiated again for a next transmission unit.

Figure 2:
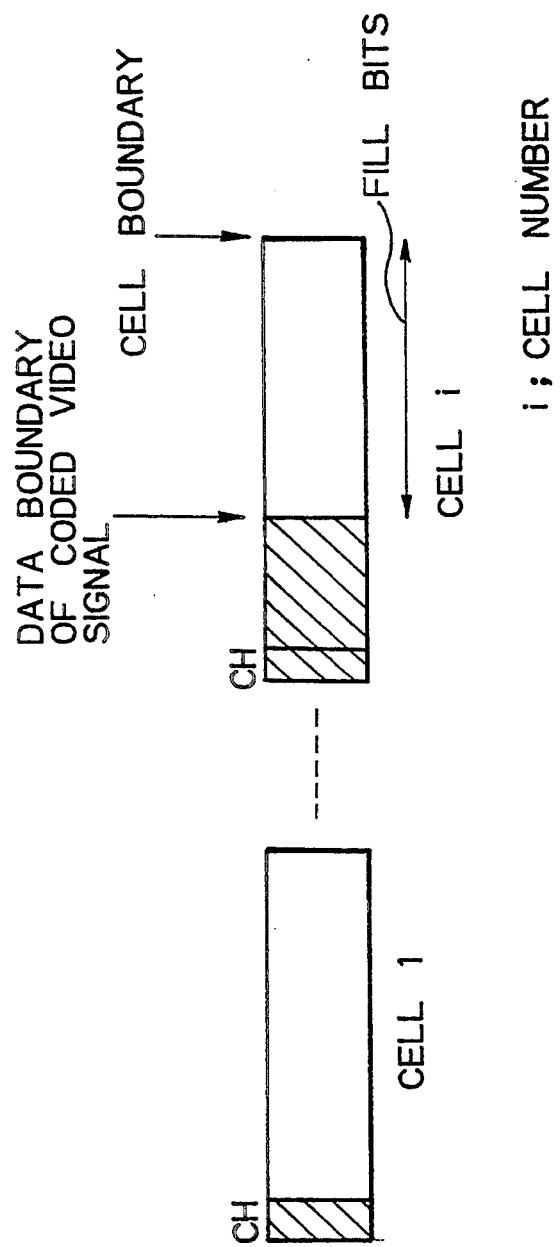
FIG.2 shows the principle of the present invention in closing a transmission unit.

FIG.2 shows the principle of closing a transmission unit in the present invention.

It is assumed that a number of available bit positions in a cell is always monitored during the insertion or packing operation of video signals into a cell.

A transmission unit is closed or terminated when one of the following two conditions is satisfied:

1) When the number of available bit positions in a cell becomes equal to or less than a predetermined first threshold value which depends upon the position of the cell in a transmission unit or a cell number, a transmission unit is closed. The cell number of the first cell is 1, and the cell number of the second cell is 2. The position of the cell or a cell number is taken into account in determining the first threshold value in order to avoid the decrease of transmission efficiency because if the transmission unit is too short, the ratio of idle fill bits increases and thereby decreases the transmission efficiency. The smaller the cell number is, the smaller the threshold value should be.

When the number of available bits in a cell is larger than said predetermined first threshold value, the packing of data into a cell is continued.

2) When the cell length or the number of cells in a transmission unit reaches a predetermined second threshold value L, the transmission unit is closed at the cell, in order to avoid the increase of undesirable effects due to cell loss in case of too long a transmission unit. The second threshold value is constant. When the transmission unit is closed in this case, the last cell is filled with at least one coded video signal, preferably, as many coded video signals, as possible so long as it is possible to pack.

In one embodiment, the threshold value for closing the transmission unit is that (1) the number of available bits is equal to or less than 24 when a cell number is equal to or larger than 1, or (2) the number of available bits is equal to or less than 36 when a cell number is equal to or larger than 2, or (3) the number of available bits is equal to or less than 48 when a cell number is equal to or larger than 3. The embodiment of the second threshold value is 7.

As mentioned above, the transmission unit is shortened without increasing the ratio of idle fill bits to the whole number of bits in the transmission unit. Therefore, the period that the boundary of the cells coincides with the data boundary of the coded video signal is shortened. Therefore, the deterioration of picture quality due to cell loss is reduced, while maintaining transmission efficiency.

Figure 3:
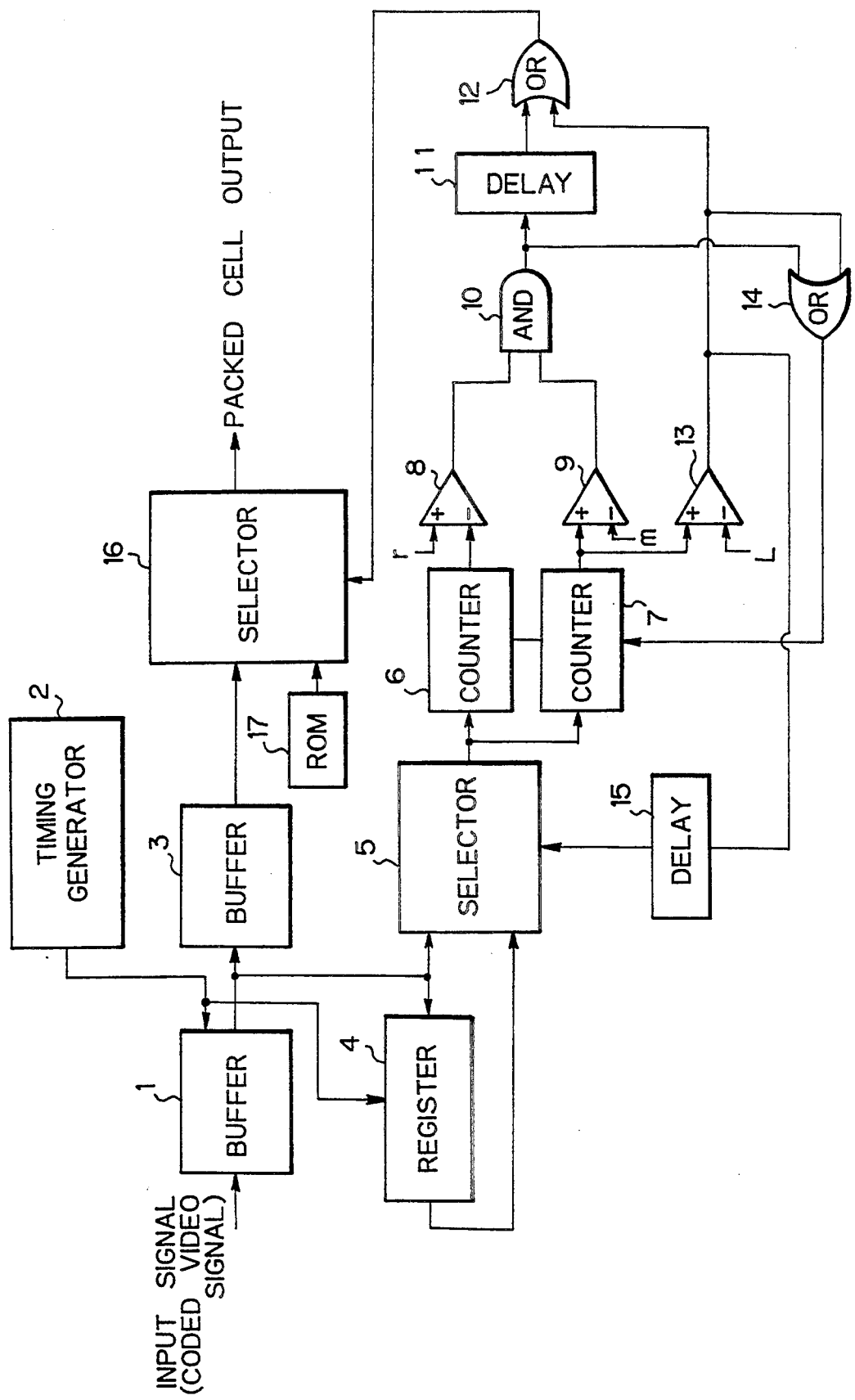
FIG.3 is a block diagram of a cell packing apparatus according to the present invention.

FIG.3 shows a block diagram of a cell packing system according to the present invention. An input coded video signal is first stored in a buffer memory 1 for each coding unit. The coding unit has for instance 64×64 pixels, which are encoded into a variable length code. The coded video signal is either longer or shorter than a bit length of a cell. The coded video signal is read out of the buffer memory 1 for each coding unit upon receipt of a read pulse from a timing generator 2, and is applied to a buffer 3, a register 4, and a selector 5. The buffer 3 and the register 4 store the coding unit temporarily. The selector 5 selects the output of the buffer 1 at this time. The coded data from the buffer 1 is applied to a counter 6 and a counter 7 through the selector 5.

The counter 6 is initiated to the bit capacity C of a cell, and is decremented one by one with modulo C so that the content of the counter 6 indicates the number of available bits in a current cell under packing operation.

The counter 7 is incremented whenever the number of input bits reaches C, so that the content of the counter 7 indicates the cell number of a cell under packing operation in a transmission unit.

The output of the counter 6, or the number of available bits in the current cell under packing operation is compared with the constant r in the comparator 8. The value r is the first threshold value. The output of the counter 7, or the cell location of the current cell under packing operation in the transmission unit is compared with the constant m in the comparator 9. The first threshold value r may depend upon the constant m. The AND circuit 10 takes the logical product of the outputs of the comparators 8 and 9. The output of the AND circuit 10 provides the first condition for closing the transmission unit.

Simultaneously, the output of the counter 7 is compared with the constant L in the comparator 13, which provides the second condition for closing the transmission unit. The constant L is the second threshold value, and shows the maximum number of cells in a transmission unit. The number L is 7 in one embodiment.

The output of the comparator 13 is applied to an OR circuit 12, which also receives an output of the AND circuit 10 through a delay circuit 11. The delay time of the delay circuit 11 is adjusted to be the same as the transmission time of a coded video signal in the buffer 3. The OR circuit 12 provides the whole condition for closing the transmission unit.

The selector 16 which selects the output of the buffer 3, which stores the coded data to be packed, is switched so that it selects the output of the ROM (read only memory) 17 which stores idle fill bits, when the output of the OR circuit 12 indicates to close the transmission unit. Therefore, idle fill bits are inserted on a cell under packing.

The OR circuit 14 receives the output of the AND circuit 10 and output of the comparator 13, and the output of the OR circuit 14 initiates the content of the counter 6 to C, and the content of the counter 7 to zero.

When the transmission unit is closed by the output of the comparator 13, the video data to be packed is already stored in the buffer 3 when the counters 6 and 7 are initiated. Therefore, the output of the comparator 13 is applied to the selector 5 through the delay circuit 15 so that the selector 5 is switched to the output of the register 4 with the delay time defined by the delay circuit 15, so that the counters 6 and 7 operate correctly. Therefore, those counters are used for next transmission unit. The delay time of the delay circuit 15 is the same as the transmission time of a cell.

As mentioned above, the present packing system of coded digital video signal into cells each having a predetermined bit length, has at least the following features.

a) The packing of coded video signal into cells is controlled based upon the relation of the data boundary of coded video signal with the boundary of cells.

b) When available bit length in a cell under packing operation is equal to or larger than a predetermined threshold value, the packing operation is continued in the current cell, and when said available bit length is smaller than said threshold value, the packing is stopped in the current cell, or the transmission unit is closed. The next packing starts in the next transmission unit.

c) When the cell number in a transmission unit reaches a predetermined value, the packing is stopped, or the transmission unit is closed.

The present invention which has the above features has the advantage that a transmission unit is shortened without increasing the ratio of idle fill bits, and therefore, the period that the data boundary of coded video signal coincides with the boundary of cells is shortened, and thus, the deterioration of picture quality due to cell loss is reduced. The structure of a packing apparatus is simple in the present invention.

FIG.4 shows curves showing the effect of the present invention (curves of n=1 through n=4), together with the curve of the prior art in a dotted line.

The test pattern for the test is the conventional one called the test picture A.

The curve of n=1 shows the case that the packing is stopped when the available bit length is equal to or less than 48 when the cell number is equal to or larger than 1. The curve of n=2 shows the case that the packing is stopped when the available bit length is equal to or less than 48 when the cell number is equal to or larger than 2. The curve n=3 shows the case that the packing is stopped when the available bit length is equal to or less than 48 when the cell number is equal to or larger than 3. The curve n=4 shows the case that the packing is stopped when the available bit length is equal to or less than 48 when the cell number is equal to or larger than 4. The maximum cell number in FIG.4 is supposed to be 7. The horizontal axis in FIG.4 shows the average number of cells in a transmission unit, obtained statistically.

It is clear in FIG.4 that the transmission efficiency is improved considerably for each average number of cells, as compared with that of the prior art.

From the foregoing it will now be apparent that a new and improved packing system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A packing system for packing coded digital video data having a variable bit length into cells each having a predetermined first bit length for transmission, comprising:
a first buffer coupled with an input terminal for storing input coded digital video data;
a second buffer for storing a content of said first buffer;
a register for storing a content of said first buffer;
a timing generator for effecting transfer of a content of said first buffer to said second buffer and said register;
a ROM storing fixed fill bits;
a selector for selectively sending outputs of one of said second buffer and said ROM to an output terminal;
a second selector for selecting one of outputs of said buffer and said register;
a first counter coupled with an output of said second selector for providing an available number of bits in a current cell undergoing packing operation;
a second counter coupled with the output of said second selector for providing a cell number of a current cell undergoing packing operation;
a first comparator for comparing an output of said first counter with a first predetermined value to provide an output when said output of said first counter reaches said first predetermined value;
a second comparator for comparing an output of said second counter with a second predetermined value to provide an output when said output of said second counter reaches said second predetermined value;
a third comparator for comparing an output of said second counter with a third predetermined value to provide an output when said output of said second counter reaches said third predetermined value;
an AND circuit for providing a logical product of outputs of said first comparator and said second comparator;
a first OR circuit for providing a logical sum of an output of said AND circuit through a delay circuit and an output of said third comparator to switch said selector to an output of said ROM;
a second OR circuit for providing a logical sum of outputs of said AND circuit and said third comparator to initiate said counters; and
a delay circuit coupled with output of said third comparator having a delay time of transmission time of one cell to switch said second selector to an output of said register.

2. A packing system according to claim 1, wherein said first and second counters, said first and second comparators and said AND circuit are means for stopping said packing operation to close a transmission unit when a number of cells in a transmission unit reaches said predetermined second value.

3. A packing system according to claim 1, wherein said first predetermined value depends upon a cell number in a transmission unit undergoing said packing operation.

4. A packing system according to claim 3, wherein said first predetermined value is 24 for a cell number equal to or larger than 1, 36 for a cell number equal to or larger than 2, and 48 for a cell number equal to or larger than 3.

5. A packing system according to claim 2, wherein said second predetermined value is 7.

* * * * *